US010203760B2

(12) United States Patent
Leng

(10) Patent No.: US 10,203,760 B2
(45) Date of Patent: Feb. 12, 2019

(54) DISPLAY DEVICE AND CONTROL METHOD THEREOF, GESTURE RECOGNITION METHOD, AND HEAD-MOUNTED DISPLAY DEVICE

(71) Applicant: BOE TECHNOLOGY GROUP CO., LTD., Beijing (CN)

(72) Inventor: Changlin Leng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 8 days.

(21) Appl. No.: 14/421,033

(22) PCT Filed: May 21, 2014

(86) PCT No.: PCT/CN2014/078015
§ 371 (c)(1),
(2) Date: Feb. 11, 2015

(87) PCT Pub. No.: WO2015/062247
PCT Pub. Date: May 7, 2015

(65) Prior Publication Data
US 2016/0034037 A1   Feb. 4, 2016

(30) Foreign Application Priority Data

Oct. 31, 2013   (CN) .......................... 2013 1 0533541

(51) Int. Cl.
G06F 3/00 (2006.01)
G06F 3/01 (2006.01)
G06F 3/14 (2006.01)
H04N 5/44 (2011.01)
(Continued)

(52) U.S. Cl.
CPC ........... *G06F 3/017* (2013.01); *G02B 27/017* (2013.01); *G06F 3/005* (2013.01); *G06F 3/0346* (2013.01);
(Continued)

(58) Field of Classification Search
None
See application file for complete search history.

(56) References Cited

U.S. PATENT DOCUMENTS

2003/0156144 A1   8/2003   Morita
2011/0115887 A1*  5/2011   Yoo ..................... G06F 3/017
                                                  348/51
(Continued)

FOREIGN PATENT DOCUMENTS

CN    101673161 A    3/2010
CN    103018905 A    4/2013
(Continued)

OTHER PUBLICATIONS

International Search Report for International Application PCT/CN2014/078015.
(Continued)

*Primary Examiner* — Ifedayo B Iluyomade
(74) *Attorney, Agent, or Firm* — Nath, Goldberg & Meyer; Joshua B. Goldberg

(57) ABSTRACT

The present invention provides a display device and a control method thereof, a gesture recognition method and a head-mounted display device. The display device of the present invention comprises a display unit, an open type head-mounted display, an image acquisition unit and a gesture recognition unit. The control method thereof comprises steps of: providing, by the open type head-mounted display, a virtual 3D control picture to a user; acquiring, by the image acquisition unit, an image of action of touching the virtual 3D control picture by the user; judging, by the gesture recognition unit, a touch position of the user in the virtual 3D control picture according to the image acquired by the image acquisition unit, and sending a control instruc-
(Continued)

tion corresponding to the touch position to a corresponding execution unit. The present invention may be used for controlling a display device.

7 Claims, 2 Drawing Sheets

(51) Int. Cl.
    *G02B 27/01* (2006.01)
    *H04N 5/232* (2006.01)
    *G06F 3/0346* (2013.01)
    *G06F 3/0488* (2013.01)
    *H04N 21/422* (2011.01)
(52) U.S. Cl.
    CPC ............ *G06F 3/04886* (2013.01); *G06F 3/14* (2013.01); *H04N 5/23229* (2013.01); *H04N 5/4403* (2013.01); *G02B 2027/0178* (2013.01); *G02B 2027/0187* (2013.01); *H04N 21/42222* (2013.01); *H04N 2005/4428* (2013.01)

(56) References Cited

U.S. PATENT DOCUMENTS

| | | | |
|---|---|---|---|
| 2012/0302289 A1* | 11/2012 | Kang | G06F 3/011 455/557 |
| 2014/0078176 A1* | 3/2014 | Kim | G06F 3/017 345/633 |
| 2015/0067580 A1* | 3/2015 | Um | G06F 3/048 715/781 |
| 2015/0153572 A1* | 6/2015 | Miao | G02B 27/017 345/8 |
| 2016/0048212 A1* | 2/2016 | Leng | G06F 3/04815 345/156 |

FOREIGN PATENT DOCUMENTS

| | | | | |
|---|---|---|---|---|
| CN | 103530061 A | | 1/2014 | |
| CN | 103793060 A | * | 5/2014 | |
| KR | 20150026336 | * | 9/2013 | ..... G02B 2027/0138 |

OTHER PUBLICATIONS

Office Action dated Nov. 19, 2015 issued in corresponding Chinese Application No. 201310533541.6.
Office Action dated Jan. 12, 2016 issued in corresponding Chinese Application No. 201310533541.6.
English translation of the Written Opinion of the International Searching Authority for International Application No. PCT/CN2014/078015.

* cited by examiner

DISPLAY DEVICE AND CONTROL METHOD THEREOF, GESTURE RECOGNITION METHOD, AND HEAD-MOUNTED DISPLAY DEVICE

This is a National Phase Application filed under 35 U.S.C. 371 as a national stage of PCT/CN2014/078015, filed May 21, 2014, an application claiming the benefit of Chinese Application No. 201310533541.6, filed Oct. 31, 2013, the content of each of which is hereby incorporated by reference in its entirety.

FIELD OF THE INVENTION

The present invention belongs to the field of gesture recognition technology, and particularly to a display device and a control method thereof, a gesture recognition method, and a head-mounted display device.

BACKGROUND OF THE INVENTION

With the development of technology, it has been possible to control a display device (a TV set, a display, etc.) by gestures. The display device having a gesture recognition function comprises a display unit for displaying and an image acquisition unit (a camera, a digital camera, etc.) for acquiring gestures. By analyzing the acquired image, an operation to be performed by a user may be determined.

In the present gesture recognition technology, "select" and "confirm" operations have to be performed by different gestures, respectively, so that the operations are troublesome. For example, if the channel of a TV set is changed by gestures, it is required to select a channel by a first gesture (e.g., waving a hand from left to right), the channel is changed once every time the hand is waved. When a correct channel is selected, the channel is accessed by a second gesture (e.g., waving a hand from top to bottom). In other words, the gesture recognition technology of an existing display device cannot realize the operation in which "select" is integrated with "confirm", that is, unlike a tablet computer, an instruction to be executed cannot be selected and executed by only "touching" a certain one of a plurality of candidate icons. The reason is because a touch position should be accurately judged for the "touch" operation. For a tablet computer, if a hand directly touches a screen, it is available to determine a touch position by a touch technology. However, for the gesture recognition technology, a hand generally cannot touch a display unit (particularly for a TV set, a user is far away from the TV display screen during normal use), but can only "point to" a certain position of the display unit (e.g., a certain icon displayed by the display unit). The accuracy of such long-distance "pointing" is very poor. When the same position of the display unit is pointed to, gestures of different users may be different. Some persons point to left, while some persons point to right, and thus where the user wants to point to on earth cannot be determined, so that the "touch" operation cannot be realized.

SUMMARY OF THE INVENTION

In view of the problem that "select" and "confirm" operations must be performed separately in the existing gesture recognition, a technical problem to be solved by the present invention is to provide a display device and a control method thereof, a gesture recognition method and a head-mounted display device, by which the "select" and "confirm" operations may be completed in one step by gesture recognition.

A technical solution employed to solve the technical problem to be solved by the present invention is a control method of a display device, the display device comprises a display unit, an open type head-mounted display, an image acquisition unit and a gesture recognition unit; the control method of the display device comprises steps of: providing, by the open type head-mounted display, a virtual 3D control picture to a user; acquiring, by the image acquisition unit, an image of action of touching the virtual 3D control picture by the user; and, judging, by the gesture recognition unit, a touch position of the user in the virtual 3D control picture according to the image acquired by the image acquisition unit, and sending a control instruction corresponding to the touch position to a corresponding execution unit.

Preferably, a distance from the virtual 3D control picture to eyes of the user is a first distance, and the first distance is less than a distance from the display unit to the eyes of the user.

Preferably, a distance from the virtual 3D control picture to eyes of the user is a first distance, and the first distance is less than or equal to a length of an arm of the user.

Preferably, a distance from the virtual 3D control picture to eyes of the user is a first distance, and the first distance is less than or equal to 0.5 m but greater than or equal to 0.25 m.

Preferably, the display unit performs display while the open type head-mounted display provides the virtual 3D control picture to the user; or, the display unit stops displaying while the open type head-mounted display provides the virtual 3D control picture to the user.

Preferably, the virtual 3D control picture is divided into at least two regions, each of which corresponds to one control instruction.

Preferably, the image acquisition unit is provided on the open type head-mounted display; and the step of judging, by the gesture recognition unit, a touch position of the user in the virtual 3D control picture according to the image acquired by the image acquisition unit comprises: judging, by the gesture recognition unit, a touch position of the user in the virtual 3D control picture according to position of a hand of the user in the image acquired by the image acquisition unit.

A technical solution employed to solve the technical problem to be solved by the present invention is a display device, comprising: a display unit that is configured to perform display; an open type head-mounted display that is configured to provide a virtual 3D control picture to a user; an image acquisition unit that is configured to acquire an image of action of touching the virtual 3D control picture by the user; and a gesture recognition unit that is configured to judge a touch position of the user in the virtual 3D control picture according to the image acquired by the image acquisition unit and send a control instruction corresponding to the touch position to a corresponding execution unit.

Preferably, the display unit is a TV display screen or a computer display screen.

Preferably, the display device further comprises: a wireless communication unit connected to the display unit and the open type head-mounted display, respectively, and configured to perform information interaction between the display unit and the open type head-mounted display.

Preferably, the image acquisition unit is provided on the open type head-mounted display; and, the gesture recognition unit is configured to judge a touch position of the user in the virtual 3D control picture according to position of a hand of the user in the image acquired by the image acquisition unit.

Preferably, a distance from the virtual 3D control picture provided by the open type head-mounted display to eyes of the user is a first distance, and the first distance is less than a distance from the display unit to the eyes of the user.

A technical solution employed to solve the technical problem to be solved by the present invention is a gesture recognition method, comprising steps of: providing, by a head-mounted display, a virtual 3D control picture to a user; acquiring, by an image acquisition unit, an image of action of touching the virtual 3D control picture by the user; and judging, by a gesture recognition unit, a touch position of the user in the virtual 3D control picture according to the image acquired by the image acquisition unit, and sending a control instruction corresponding to the touch position to a corresponding execution unit.

A technical solution employed to solve the technical problem to be solved by the present invention is a head-mounted display device, comprising: a head-mounted display that is configured to provide a virtual 3D control picture to a user; an image acquisition unit that is configured to acquire an image of action of touching the virtual 3D control picture by the user; and a gesture recognition unit that is configured to judge a touch position of the user in the virtual 3D control picture according to the image acquired by the image acquisition unit and send a control instruction corresponding to the touch position to the head-mounted display.

Wherein, the "head-mounted display", also referred to as a glasses display device, a pair of video glasses, a portable players, etc., is a display apparatus directly worn in front of eyes of a user in a fashion similar to a helmet or a pair of glasses. As the head-mounted display directly provides an image for the eyes of the user, respectively, it may be likely to realize 3D stereoscopic display, while the "open type" indicates that a user may watch the image displayed by the head-mounted display while watching outside scenery.

Wherein, the "virtual 3D control picture" refers to a stereoscopic picture displayed by the open type head-mounted display device, and the picture is used for realizing control.

Wherein, the distance from the virtual 3D control picture to the eyes of the user refers to a distance from the virtual 3D control picture sensed by the user to the user. The sense of distance is a part of the stereoscopic sense, and is caused by a difference between the images watched by left and right eyes. The user may sense that the virtual 3D control picture is located at a position with a certain distance in front of the user, as long as the open type head-mounted display displays certain contents.

Wherein, the "execution unit" refers to any unit capable of executing a corresponding control instruction. For example, for a channel changing instruction, the execution unit is a display unit, while for a volume changing instruction, the execution unit is a sounding unit.

In the display device and control method thereof, the gesture recognition method and the head-mounted display device provided by the present invention, the head-mounted display may present a virtual 3D control picture for a user, and the distance from the virtual 3D control picture to the user is adjustable, so that the user will sense that the picture is in front of the user and thus may accurately "touch" the virtual 3D control picture by directly stretching out his or her hand. Accordingly, the actions of different users touching a same position of the virtual 3D control picture are identical or similar, so that the gesture recognition unit may accurately judge a touch position desired by the user, and the "touch" operation in which "select" is integrated with "confirm" is thus realized.

The present invention is used for controlling a display device, and particularly suitable for the control of a TV set.

Figure 1:
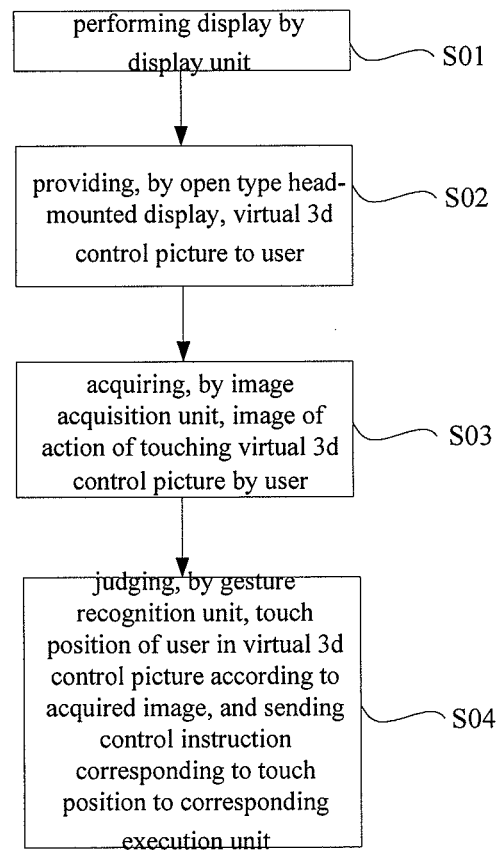
FIG. 1 is a flowchart of a control method of a display device according to a first embodiment of the present invention.

Reference numerals: 1—Display unit; 2—Open type head-mounted display; 3—Hand of a user; 4—Virtual 3D control picture; 5—Image acquisition unit; and, 6—Wireless communication unit.

Figure 3:
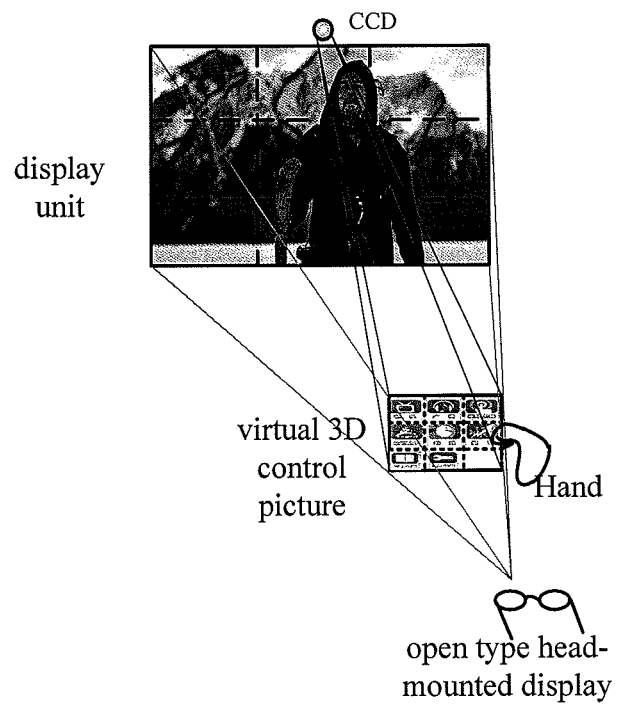

FIG. 3 is another schematic diagram when the display device according to the first embodiment of the present invention displays a virtual 3D control picture, where the display unit displays a conventional picture to allow the user to watch, and the virtual 3D control picture is different from the conventional picture.

Figure 4:
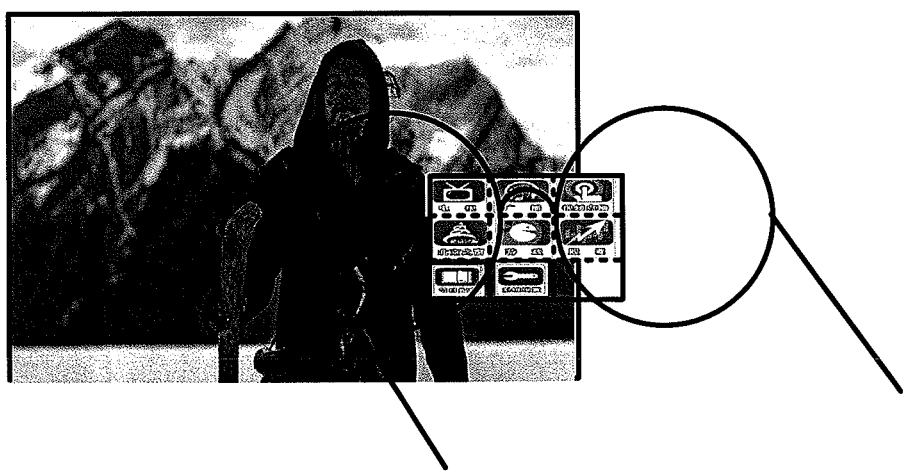

FIG. 4 is a diagram viewed through the open type head-mounted display according to the first embodiment of the present invention, where the user can watch the virtual 3D control picture by the open type head-mounted display while watching outside scenery (i.e., the conventional picture displayed by the display unit).

DETAILED DESCRIPTION OF THE EMBODIMENTS

To make those skilled in the art better understand the technical solutions of the present invention, the present invention will be further described below in detail in conjunction with the accompanying drawings and specific embodiments.

First Embodiment

As shown in FIG. 1, this embodiment provides a control method of a display device. The display device comprises a display unit, an open type head-mounted display, an image acquisition unit and a gesture recognition unit, and preferably further comprises a wireless communication unit.

The display unit is any display equipment capable of displaying, such as liquid crystal display equipment, organic light-emitting diode display equipment, etc.

Preferably, the display unit is a TV display screen. As a person needs to perform relatively frequent operations (e.g., changing a channel, adjusting volume, etc.), and a user is at a distance far away from a TV set in general and it is difficult to control the TV set by touching or in other manners, the present invention is more applicable to TV sets. Of course, it is also feasible that the display unit is a computer display screen or other equipment.

The open type head-mounted display, also referred to as a glasses display device, a pair of video glasses, a portable players, etc., is a display equipment directly worn in front of eyes of a user in a fashion similar to a helmet or a pair of glasses. As the head-mounted display directly provides an image for the eyes of the user, respectively, it may be likely to realize 3D stereoscopic display, while the "open type" indicates that a user may watch the image displayed by the head-mounted display while watching outside scenery.

The image acquisition unit is configured to acquire images, and may be a CCD (Charge Coupling Device) camera, a digital camera or other known devices.

The wireless communication unit refers to a unit capable of transmitting and receiving information in a wireless manner (e.g., an infrared communication unit, a radio frequency communication unit, etc.) and is configured to realize information interaction between devices separated from each other in space.

Specifically, the control method comprises the following steps S01 through S04.

S01: Displaying, by the display unit, a conventional picture (e.g., a television program).

In other words, the display unit performs normal display and allows a user to watch, while the open type head-mounted display may perform display simultaneously or may be closed.

S02: Providing, by the open type head-mounted display, a virtual 3D control picture to a user.

In this step, the virtual 3D control picture refers to a picture used specially for control operations of a display device, including various control instructions for a display device. By selecting different control instructions, a user may realize different controls of the display device.

Figure 2:
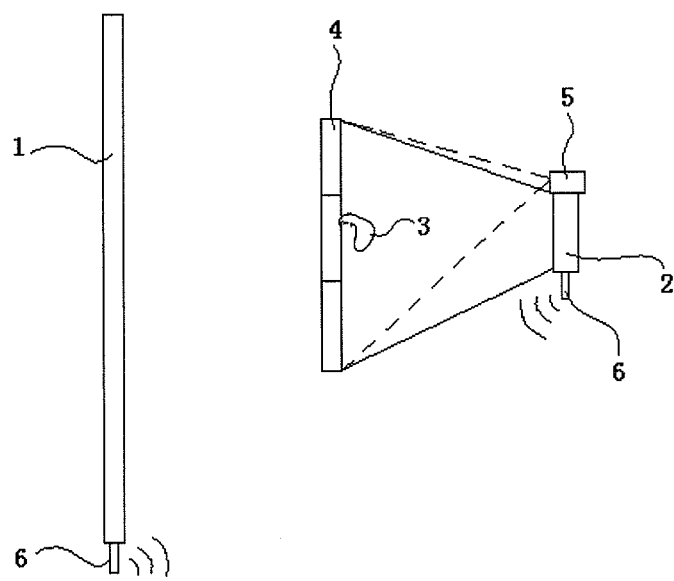
FIG. 2 is a schematic diagram when the display device according to the first embodiment of the present invention displays a virtual 3D control picture.

As shown in FIG. 2, the display unit 1 displays a conventional picture, and the open type head-mounted display 2 displays a stereoscopic virtual 3D control picture 4 for a user and allows the user to sense that the virtual 3D control picture 4 is located at a certain distance (a first distance) in front of the user. Generally, the first distance is less than the distance from the display unit 1 to the user (when the user faces the display unit 1). As the user senses that the virtual 3D control picture 4 is relatively close to the user himself or herself, the user may do an action of accurately "touching" a certain position of the picture by stretching out his or her hand 3, so that the display device may also more accurately judge which operation is to be performed by the user, thereby realizing "touch" control.

Preferably, the first distance is less than or equal to the length of an arm of a user. When the first distance is less than or equal to the length of an arm of a user, the user senses that he or she may "touch" the virtual 3D control picture 4 by stretching out his or her hand 3, so that the accuracy of a touch action may be ensured to the largest extent.

Preferably, the first distance is less than or equal to 0.5 m but greater than or equal to 0.25 m. In accordance with the range of the first distance, the great majority of people do not need to straighten their arms in an effort to "reach" the virtual 3D control picture 4, and will not sense that the virtual 3D control picture 4 is too close to him or her.

Preferably, while the open type head-mounted display 2 provides the virtual 3D control picture 4 to the user, the display unit 1 still performs display.

In other words, in this case, the user may simultaneously watch the contents displayed by both the open type head-mounted display 2 and the display unit 1, so that it is convenient for the user to perform control (e.g., adjusting volume or changing a channel) while watching the display unit 1. Apparently, in order to avoid the mutual interference between the pictures displayed by both the open type head-mounted display 2 and the display unit 1, the virtual 3D control picture 4 watched by the user may be smaller in size than the screen of the display unit 1 (e.g., located on an edge or a corner of the screen of the display unit 1).

Preferably, as another implementation of this embodiment, while the open type head-mounted display 2 provides the virtual 3D control picture 4 to a user, the display unit 1 stops displaying.

In other words, if it is required to perform control, the display unit 1 is closed, and the user only can watch the virtual 3D control picture 4, so that the user may concentrate his or her attention to operate the virtual 3D control picture 4 without being interfered by the content displayed by the display unit 1. In this case, the virtual 3D control picture 4 may be relatively large, so that it is easier to perform accurate touch operations.

Preferably, the virtual 3D control picture 4 is divided into at least two regions, each of which corresponds to one control instruction. In other words, the virtual 3D control picture 4 may be divided into a plurality of different regions. By touching different regions, different control instructions may be executed, so that a plurality of different operations may be performed by one virtual 3D control picture 4. For example, the virtual 3D control picture 4 may be equally divided into 9 rectangular regions in 3 rows×3 columns, and each of the rectangular regions corresponds to one control instruction (e.g., changing volume, changing the channel, changing brightness, quitting the virtual 3D control picture 4, etc.).

Of source, it is also feasible that the virtual 3D control picture 4 corresponds to only one control instruction (for example, the corresponding instruction is "entering the control picture of full screen").

In this step, the content of the virtual 3D control picture 4 displayed by the open type head-mounted display 2 may be stored in the open type head-mounted display 2, but it is apparent that the content of the virtual 3D control picture 4 may also be sent by the display unit 1 to the open type head-mounted display 2 in real time (e.g., by a wireless communication unit 6).

S03: Acquiring, by the image acquisition unit, an image of action of touching the virtual 3D control picture by the user.

As shown in FIG. 2, the image acquisition unit 5 acquires the image of action of touching the virtual 3D control picture 4 by the hand 3 of the user. In other words, when the open type head-mounted display 2 displays the virtual 3D control picture 4, the image acquisition unit 5 is enabled to acquire the image of the action of the user, particularly to acquire the image of action of touching the virtual 3D control picture 4 by stretching his or her hand 3 of the user.

Of course, when there is no virtual 3D control picture 4 displayed, the image acquisition unit 5 may also be enabled to acquire images of other gestures of the user.

Preferably, the image acquisition unit 5 may be provided on the open type head-mounted display 2.

In other words, the image acquisition unit 5 may be provided on the open type head-mounted display 2 to acquire the image of the hand 3 of the user from "rear". The advantage of this mode lies in that, as the relative position relationship between the open type head-mounted display 2 and the user is definite (because the open type head-mounted display must be worn on the head of the user), the relative position relationship between the image acquisition unit 5 and the user is also definite. Accordingly, no matter where the user is located, the image acquisition unit 5 can acquire the image of the hand 3 of the user, and the images acquired by the image acquisition unit 5 are certainly identical as long as the user does the same gestures. Conversely, if the image acquisition unit 5 is provided at other positions (e.g., provided on the display unit 1), the user may go beyond the acquisition range of the image acquisition unit 5, so that the image acquisition unit 5 cannot acquire gesture images. Meanwhile, when the user does the same gestures at different positions, the image acquisition unit 5 acquires different images (at least the positions of the user in the images are different), so that the processing process of images is troublesome.

Another advantage of arranging the image acquisition unit 5 on the open type head-mounted display 2 lies in that, if the gesture recognition unit (not shown) is also provided on the open type head-mounted display 2, the image acquisition unit 5 may transmit the acquired images (apparently having large amount of information) to the gesture recognition unit in a wired manner, and after the gesture recognition unit processes the image, it is only need to transmit a final control instruction (apparently having smaller amount of information) to an execution unit (e.g., the display unit 1) in a wireless manner (e.g., by a wireless communication unit 6), thereby avoiding the wireless transmission of images having larger amount of information.

S04: Judging, by the gesture recognition unit, a touch position of the user in the virtual 3D control picture according to the image acquired by the image acquisition unit, and sending a control instruction corresponding to the touch position to a corresponding execution unit.

In this step, the "execution unit" refers to any unit capable of executing a corresponding control instruction. For example, for a channel changing instruction, the execution unit is a display unit, while for a volume changing instruction, the execution unit is a sounding unit.

As described above, as the virtual 3D control picture 4 is located at a certain distance in front of a user, as shown in FIG. 2, the gesture recognition unit may also determine a spatial position of the virtual 3D control picture 4 relative to the image acquisition unit 5 (taking the image acquisition unit 5 being provided on the open type head-mounted display 2 as example). Accordingly, when the user stretches his or her hand 3 to touch the virtual 3D control picture 4, the gesture recognition unit may determine the touched position of the virtual 3D control picture 4 according to the position of the hand 3 of the user in the acquired image, i.e., determine the control instruction corresponding to the gesture of the user, so that the gesture recognition unit may send the control instruction to a corresponding execution unit (e.g., by a wireless communication unit 6) and then allows the execution unit to execute the corresponding instruction, thereby realizing control.

Of course, it should be understood that, if the image acquisition unit 5 is provided at other positions (e.g., on the display unit 1), when the acquired image is analyzed, it is also required to judge the relative positions of the body of the user and the hand 3 so as to determine the touch position of the user.

The embodiment of the present invention further provides a display device controlled by using the method, comprising: a display unit 1 for displaying; an open type head-mounted display 2 that is configured to provide a virtual 3D control picture 4 to a user; an image acquisition unit 5 that is configured to acquire an image of action of touching the virtual 3D control picture 4 by the user; and a gesture recognition unit that is configured to judge a touch position of the user in the virtual 3D control picture 4 according to the image acquired by the image acquisition unit 5 and send a control instruction corresponding to the touch position to a corresponding execution unit.

Preferably, the display unit 1 is a TV display screen or a computer display screen.

Preferably, the display device further comprises: a wireless communication unit 6 connected to the display unit 1 and the open type head-mounted display 2, respectively, and configured to perform information interaction between the display unit 1 and the open type head-mounted display 2.

Of course, it should be understood that the wireless communication unit 6 in this embodiment is not necessary. For example, if information of the virtual 3D control picture 4 is stored in the open type head-mounted display 2, and both the image acquisition unit 5 and the gesture recognition unit are provided on the display unit 1, the display unit 1 is not required to perform information interaction with the open type head-mounted display 2, so that it is not necessary to provide the wireless communication unit 6.

Preferably, the image acquisition unit 5 is provided on the open type head-mounted display 2; and, the gesture recognition unit is configured to judge a touch position of the user in the virtual 3D control picture 4 according to the position of a hand 3 of the user in the image acquired by the image acquisition unit 5. In addition, the gesture recognition unit may also be provided on the open type head-mounted display 2.

Preferably, a distance from the virtual 3D control picture 4 provided by the open type head-mounted display 2 to the eyes of the user is a first distance, and the first distance is less than the distance from the display unit 1 to the eyes of the user.

Second Embodiment

This embodiment provides a gesture recognition method, comprising the following steps of: providing, by a head-mounted display, a virtual 3D control picture to a user; acquiring, by an image acquisition unit, an image of action of touching the virtual 3D control picture by the user; and, judging, by a gesture recognition unit, a touch position of the user in the virtual 3D control picture according to the image acquired by the image acquisition unit, and sending a control instruction corresponding to the touch position to a corresponding execution unit.

In other words, the gesture recognition method is not limited to controlling a display device (i.e., may be independent from a display unit), and may also be used for controlling other devices (including controlling a head-mounted display) as long as the gesture recognition unit sends a control instruction to a corresponding device (e.g., in a wireless manner). For example, a TV set, a computer, an air conditioner, a washing machine and other devices may be controlled uniformly by a special gesture recognition system (or referred to as a head-mounted display device).

Meanwhile, as it is not necessary for a user to watch the display unit, the head-mounted display is unnecessarily of an open type, and may also be a closed type head-mounted display (that is, the user cannot watch outside scenery).

Third Embodiment

This embodiment provides a head-mounted display device, comprising: a head-mounted display that is configured to provide a virtual 3D control picture to a user; an image acquisition unit that is configured to acquire an image of action of touching the virtual 3D control picture by the user; and a gesture recognition unit that is configured to judge a touch position of the user in the virtual 3D control picture according to the image acquired by the image acquisition unit and send a control instruction corresponding to the touch position to the head-mounted display.

In other words, the gesture recognition method is not limited to the use in a display device, and may also be directly used in a head-mounted display device (that is, there may be no display unit). Meanwhile, as it is not necessary for a user to watch the display unit, the head-mounted display is unnecessarily of an open type, and may also be a closed type head-mounted display (that is, the user cannot watch outside scenery).

It should be understood that, the forgoing implementations are merely exemplary implementations used for describing the principle of the present invention, but the present invention is not limited thereto. A person of ordinary skill in the art may make various variations and improvements without departing from the spirit and essence of the present invention, and these variations and improvements are also deemed as falling within the protection scope of the present invention.

The invention claimed is:

1. A control method of a display device, wherein the display device comprises a display, an open type head-mounted display, a camera and a gesture recognition processor, both the camera and the gesture recognition processor are provided on the open type head-mounted display, the control method of the display device comprises steps of: providing, by the open type head-mounted display, a virtual 3D control picture to a user distance from the virtual 3D control picture to eyes of the user is a first distance, the first distance is less than a distance from the display to the eyes of the user, and the virtual 3D control picture is located on an edge or a corner of the display; acquiring, by the camera, an image of action of touching the virtual 3D control picture by the user, and transmitting the image acquired by the camera to the gesture recognition processor in a wired manner; judging, by the gesture recognition processor, a touch position of the user in the virtual 3D control picture according to the image acquired by the camera, and sending a control instruction corresponding to the touch position to a corresponding executor in a wireless manner; and displaying, by the display, a conventional picture to avow the user to watch, wherein the virtual 3D control picture is different from the conventional picture, the virtual 3D control picture is a picture used for control operations of the display device, and in a case where the operations of the display device is controlled by the user, the display stops displaying so that only the virtual 3D control picture is watched by the user.

2. The control method of a display device according to claim 1, wherein
a distance from the virtual 3D control picture to eyes of the user is a first distance, and the first distance is less than or equal to 0.5 m but greater than or equal to 0.25 m.

3. The control method of a display device according to claim 1, wherein
the virtual 3D control picture is divided into at least two regions, each of which corresponds to one control instruction.

4. The control method of a display device according to claim 1, wherein
the step of judging, by the gesture recognition processor, a touch position of the user in the virtual 3D control picture according to the image acquired by the camera comprises: judging, by the gesture recognition processor, a touch position of the user in the virtual 3D control picture according to position of a hand of the user in the image acquired by the camera.

5. A display device, comprising a display, an open type head-mounted display, a camera, and a gesture recognition processor, both the camera and the gesture recognition processor are provided on the open type head-mounted display, wherein the display is configured to perform display; the open type head-mounted display is configured to provide a virtual 3D control picture to a user, a distance from the virtual 3D control picture to eyes of the user is a first distance, the first distance is less than a distance from the display to the eyes of the user, and the virtual 3D control picture is located on an edge or a corner of the display; the camera is configured to acquire an image of action of touching the virtual 3D control picture by the user and transmit the acquired image to the gesture recognition processor in a wired manner; the gesture recognition processor is configured to judge a touch position of the user in the virtual 3D control picture according to the image acquired by the camera and send a control instruction corresponding to the touch position to a corresponding executor in a wireless manner; and the display is configured to display a conventional picture to allow the user to watch, wherein the virtual 3D control picture is different from the conventional picture, the virtual 3D control picture is a picture used for control operations of the display device, and in a case where the operations of the display device is controlled by the user, the display stops displaying so that only the virtual 3D control picture is watched by the user.

6. The display device according to claim 5, further comprising:
a wireless communication unit connected to the display and the open type head-mounted display, respectively, and configured to perform information interaction between the display and the open type head-mounted display.

7. The display device according to claim 5, wherein
the gesture recognition processor is configured to judge a touch position of the user in the virtual 3D control picture according to position of a hand of the user in the image acquired by the camera.

* * * * *